(12) United States Patent
Christmas et al.

(10) Patent No.: US 12,093,147 B1
(45) Date of Patent: Sep. 17, 2024

(54) COMPUTER-BASED SYSTEM FOR AUTOMATIC REPAIR OF TRANSACTION INFORMATION

(71) Applicant: Wells Fargo Bank, N.A., San Francisco, CA (US)

(72) Inventors: Brenda Sue Christmas, Fountain Hills, AZ (US); Richard Leary, Winston-Salem, NC (US); Narayanan Ganapathy Iyer, Gilbert, AZ (US); David R. Bruins, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 88 days.

(21) Appl. No.: 17/103,790

(22) Filed: Nov. 24, 2020

(51) Int. Cl.
*G06F 11/14* (2006.01)
*G06F 16/215* (2019.01)
*G06Q 40/02* (2023.01)

(52) U.S. Cl.
CPC ...... *G06F 11/1474* (2013.01); *G06F 11/1405* (2013.01); *G06F 16/215* (2019.01); *G06Q 40/02* (2013.01)

(58) Field of Classification Search
CPC .............. G06F 11/1474; G06F 16/215; G06F 11/1406; G06Q 40/02; G06V 10/98
See application file for complete search history.

(56) References Cited

U.S. PATENT DOCUMENTS

| 6,609,125 B1 | 8/2003 | Layne et al. |
| 8,301,567 B2 | 10/2012 | Hawkins |

(Continued)

FOREIGN PATENT DOCUMENTS

| FR | 2961324 A1 | 12/2011 |
| WO | 2019099012 A1 | 5/2019 |

OTHER PUBLICATIONS

Meija, "Artificial Intelligence in Payment Processing—Current Applications", Emerj, The AI Research and Advisory Company, Sep. 8, 2019. Retrieved from the Internet: <https://emerj.com/ai-sector-overviews/artificial-intelligence-in-payment-processing-current-applications/> 5 pp.

(Continued)

*Primary Examiner* — Apu M Mofiz
*Assistant Examiner* — Farhad Agharahimi
(74) *Attorney, Agent, or Firm* — Shumaker & Sieffert, P. A.

(57) ABSTRACT

A computer system is described that is configured to make automated repairs to failed electronic transactions. The computer system receives an electronic transaction data file including a plurality of electronic transactions and determines that processing of at least one electronic transactions of the data file has failed due to an error in transaction information. The computer system also identifies at least one financial account in an account database that includes identification information that matches identification information included in the transaction information of the at least one electronic transaction that failed. The computer system may repair the error in the transaction information of the at least one electronic transaction based on information associated with the at least one financial account and send the repaired at least one electronic transaction to an electronic transaction processing queue.

19 Claims, 4 Drawing Sheets

(56) References Cited

U.S. PATENT DOCUMENTS

| | | | | |
|---|---|---|---|---|
| 9,235,757 | B1* | 1/2016 | Liu | G06V 20/62 |
| 9,317,745 | B2 | 4/2016 | Smith et al. | |
| 9,318,108 | B2 | 4/2016 | Gruber et al. | |
| 2004/0199463 | A1* | 10/2004 | Deggendorf | G06Q 20/10 |
| | | | | 705/39 |
| 2007/0217669 | A1* | 9/2007 | Swift | G06Q 40/00 |
| | | | | 382/139 |
| 2012/0016896 | A1* | 1/2012 | Butt | G06F 16/90344 |
| | | | | 707/E17.135 |
| 2013/0290177 | A1* | 10/2013 | Milam | G06Q 20/08 |
| | | | | 705/40 |
| 2014/0153830 | A1* | 6/2014 | Amtrup | G06V 30/416 |
| | | | | 382/190 |
| 2014/0195395 | A1 | 7/2014 | Bhakta et al. | |
| 2019/0171845 | A1 | 6/2019 | Dotan-Cohen et al. | |
| 2019/0253431 | A1 | 8/2019 | Atanda | |
| 2020/0380286 | A1* | 12/2020 | Li | G06N 3/08 |

OTHER PUBLICATIONS

"Meet KAI—The Digital Experience Platform Created to Master the Language of Banking and Finance", Kasisto, Jul. 2020. Retrieved from the Internet: <https://kasisto.com/kai/> 5 pp.

"Self-Service: A Modern Competitive Advantage" NativeChat, Progress, Jul. 2020. Retrieved from the Internet: <https://www.progress.com/nativechat> 4 pp.

* cited by examiner

COMPUTER-BASED SYSTEM FOR AUTOMATIC REPAIR OF TRANSACTION INFORMATION

TECHNICAL FIELD

The disclosure relates to computing devices executing software applications.

BACKGROUND

An automated clearing house (ACH) is an electronic network for processing monetary transactions, typically domestic and low value payments, between participating financial institutions. ACH transactions provide a convenient transaction option for both credit transfers and direct debits, and typically carry fees low enough to encourage their use for low value payments. The ACH system is designed to process batches of payments containing numerous transactions and charge fees low enough to encourage its use for low value payments. ACH credit transfers are initiated by a payer and include payments such as: direct deposits, payrolls, retail payments and vendor payments. ACH direct debit collections are initiated by the payee with pre-authorization from the payer. ACH direct debits include consumer payments such as utility bills, insurance premiums, mortgage loans, and other types of bills. Transactions received by an Originating Depository Financial Institution (ODFI), such as a bank, during the day are stored and transmitted in batches to the ACH, typically on a periodic basis either at the end of the day or in cycles throughout the day. An ACH operator, e.g., the Federal Reserve Banks' Automated Clearing House (FedACH), Electronic Payments Network (EPN), and the like, combines the received transaction information within each cycle and informs each ODFI of the net settlement amount for which they are responsible for the cycle. The ACH operator ensures that the settlement amounts are received from all participants for the cycle so that the cycle can be executed and informs the Receiving Depository Financial Institution (RDFI) of the transaction details. The RDFI then executes the transaction, e.g., crediting payment to a payee, and the ODFI debits the ordering payer's account. ACHs are net settlement systems, so settlement may be delayed for days. ACHs may allow for the transfer of a limited amount of additional information along with payment instructions.

SUMMARY

In general, this disclosure describes a computer-based system for automatically correcting or repairing transaction information to avoid failed electronic transactions (e.g., automated clearing house (ACH) transactions). The computer-based system may include execute one or more software applications that can automatically correct a failed electronic transaction e.g., a software bot such as an internet or web robot, or "bot." The techniques enable automatic repair of transaction information of electronic transactions that would otherwise require time and attention of a human operator. The techniques may provide for a simplified electronic transaction repair process and improved electronic transaction throughput.

The computer-based system may comprise one or more computing devices associated with a financial institution, e.g., a bank, a business, or a third-party. In some examples, a bot may automatically correct a failed electronic transaction based on information and/or metadata within the incoming transaction data file, such as a social security number (SSN). The bot may use the information and/or metadata in the transaction data file to identify one or more accounts in a banking account database that are linked to the information and/or metadata. For example, the bot may use a SSN in the metadata of a transaction data file for a failed electronic transaction to look up one or more accounts linked to the SSN in one or more banking account databases. The bot may repair the transaction information based on the linked database accounts to enable processing of the transaction based on the repaired transaction information. If the bot cannot automatically repair the transaction information, the bot may queue the failed electronic transaction for manual review by a human operator or another rule processing bot.

In one example, this disclosure describes a method includes receiving, by a computing device, an electronic transaction data file including a plurality of electronic transactions; determining, by the computing device, that processing of at least one electronic transaction of the plurality of electronic transactions has failed due to an error in transaction information of the at least one electronic transaction; identifying, by the computing device executing at least one bot, at least one financial account including identification information that matches identification information included in the transaction information of the at least one electronic transaction; repairing, by the computing device executing the at least one bot, the error in the transaction information of the at least one electronic transaction based on information associated with the at least one financial account; and processing, by the computing device, the at least one electronic transaction based on the repaired transaction information of the at least one electronic transaction.

In another example, this disclosure describes a system includes a database including a plurality of financial accounts; a memory; and one or more processors in communication with the database and the memory, the one or more processors configured to: receive an electronic transaction data file including a plurality of electronic transactions; determine that processing of at least one electronic transaction of the plurality of electronic transactions has failed due to an error in transaction information of the at least one electronic transaction; identify at least one financial account in the database including identification information that matches identification information included in the transaction information of the at least one electronic transaction; repair the error in the transaction information of the at least one electronic transaction based on information associated with the at least one financial account; and send the repaired at least one electronic transaction to an electronic transaction processing queue.

In another example, this disclosure describes a computer readable medium comprising instructions that when executed cause one or more processors to: retrieve, from a failed transaction queue, an electronic transaction that has failed due to one of a transposition of one or more digits, a mismatched digit, or a missing digit in one of an account number or a routing number; identify at least one financial account in an account database, wherein identifying the at least one financial account comprises: determining that identification information associated with the at least one financial account matches identification information included in the transaction information of the electronic transaction; and determining that one of a first six digits, a middle six digits, or a last six digits of an account number or a routing number included in the at least one financial account matches a corresponding one of a first six digits, a middle six digits, or a last six digits of an account number or a routing number of the electronic transaction; if more than one financial account in the account database includes identification information that matches identification information included in the transaction information of the at least one electronic transaction, forward the electronic transaction to a manual repair queue; if a single financial account in the account database includes identification information that matches identification information included in the transaction information of the at least one electronic transaction, repair the account number or the routing number of the electronic transaction to be the account number or the routing number of the single financial account; process, by the computing device, the at least one electronic transaction based on the repaired transaction information of the at least one electronic transaction.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure relates to any computer-based electronic transaction system, such as an ACH network. An ACH is an electronic network for processing monetary transactions between participating financial institutions. The ACH network annual volume is over 20 billion payments, and a large bank may receive hundreds of thousands of electronic payments per day or more and may typically have thousands of failed electronic transactions per day that may need manual correction by a human operator. Electronic transactions may fail for a variety of reasons. For example, an electronic transaction or credit may fail to post to a banking account, e.g., in a banking account database, due to errors in the electronic transaction information transmitted and/or received between financial institutions, e.g., errors in the data files exchanged via the electronic network. Errors may occur in transaction information, such as transaction originator identification information, transaction recipient identification information, account information such as routing number and account number for originator and/or recipient, payment information such as the amount and date of the deposit, and/or other information such as data file information, metadata, network information, and the like. Such errors may include transposed digits, the account being closed, and a new account opened without a link, the routing number being incorrect, and the like.

The volume of electronic transactions that a bank receives, and the volume of electronic transaction failures, may change drastically due to a variety of causes. For example, the volume of electronic transactions, and of electronic transaction failures, may increase by an order of magnitude within months for such events such as the Coronavirus Aid, Relief, and Economic Security Act (CARES Act) of 2020, which included $300 billion in one-time cash payments to individual Americans. In accordance with the techniques described herein, business logic rules may be executed automatically by a software application, such as one or more bots, to repair certain electronic transactions and reduce the volume of failed electronic transactions forwarded for manual repair.

Figure 1:
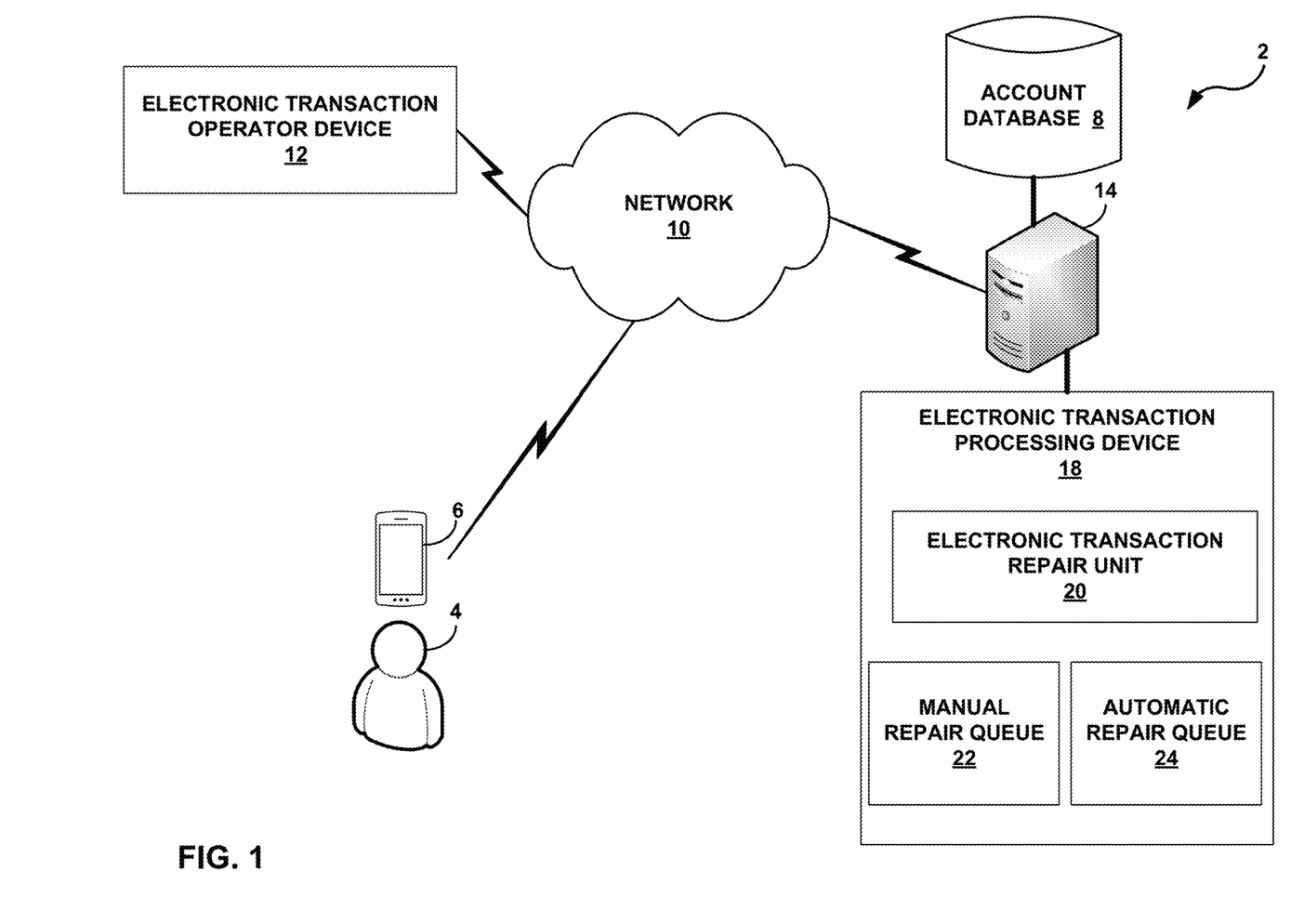
FIG. 1 is a block diagram illustrating an example computer-based system for automatically correcting failed electronic transactions, in accordance with the techniques of this disclosure.

FIG. 1 is a block diagram illustrating an example computer-based system 2 for automatically correcting failed electronic transactions (e.g., ACH transactions), in accordance with the techniques of this disclosure. As illustrated in FIG. 1, system 2 includes an electronic transaction operator device 12 and a bank server 14 that may communicate via network 10.

In some examples, network 10 may comprise a public network, such as the Internet. Although illustrated as a single entity, network 10 may comprise a combination of public and/or private networks. In some examples, network 10 may comprise one or more of a wide area network (WAN) (e.g., the Internet), a local area network (LAN), a virtual private network (VPN), or another wired or wireless communication network.

In some examples, electronic transaction operator device 12 may be configured to receive and combine information submitted by one or more entities, financial institutions, banks, and the like over a period of time. For example, an originator 4 may initiate a transaction via transmitting transaction information via originator device 6 to bank server 14, e.g., via network 10 in the example shown. Originator 4 may be a company or organization, e.g., initiating payroll payments via ACH, a government agency, e.g., the internal revenue service (IRS) initiating tax refund and/or stimulus payments via ACH, individual persons initiating an electronic transaction, or any entity initiating an electronic transaction. Originator device 6 may be a company, organization, or agency server or computing device, an individual person's computing device, a financial institution kiosk and/or automated teller machine (ATM), a financial institution customer service representative's computer terminal, or any suitable device suitable for initiating an electronic transaction with bank server 14, for example, by sending transaction information to bank server 14 via network 10. In some examples, there may be a plurality of originators 4 operating a plurality of originator devices 6 in communication with network 10. In some examples, originator device 6 may be a customer device that may be associated with either a transaction originator and/or a transaction receiver.

Bank server 14 may be configured to gather, collect, and/or compile a plurality of transaction initiations from one or more originator devices 6 during a bank cycle, e.g., on a periodic basis, and create an electronic transaction file including transaction information for each of the transaction initiations during the bank cycle. In some examples, a bank cycle may be seconds, minutes, hours, or days. In some examples, there may be several bank cycles per day. In some examples, bank server 14 may create the electronic transaction datafile in a predefined format, for example a National Automated Clearinghouse Association (NACHA) format such as datafile 300 illustrated and described below with reference to FIG. 3. Bank server 14 may be configured to transmit the electronic transaction file for the bank cycle to electronic transaction operator device 12, e.g., via network 10 at the end of the cycle period.

Electronic transaction operator device 12 may be configured to receive and combine electronic transaction information from bank server 14 and other entity servers during an operator cycle, e.g., on a periodic basis. For example, electronic transaction operator device 12 may be configured to receive and combine one or more electronic transaction data files from bank server 14 and/or one or more other bank or entity servers during an operator cycle. Electronic operator device 12 may process the combined electronic transaction data files, and then uncombine and transmit the processed electronic transaction information back to each respective bank and/or entity server, including bank server 14, after processing. In some examples, an operator cycle may be seconds, minutes, hours, or days, and may be the same or different from a bank cycle. In some examples, there may be several operator cycles per day.

In some examples, electronic transaction operator device 12 may be configured to process electronic transaction information, such as electronic transaction data files, by determining a net settlement amount for which each entity, bank, and/or financial institution is responsible for the cycle. In some examples, electronic transaction operator device 12 may be configured to ensure that the settlement amounts are received from all entities, banks, and/or financial institutions for the cycle such that the cycle may be executed. Electronic transaction operator device 12 may be configured to inform each entity, bank, and/or financial institution of the transaction details processed during the cycle, e.g., via network 10. For example, electronic transaction operator device 12 may be configured to transmit transaction details to bank server 14 via network 10, e.g., as an electronic transaction data file. One or more devices of each entity, bank, and/or financial institution, e.g., bank server 14, may be configured to credit and/or debit an account of each originator 4 and/or receiver or receiving entity based on the received transaction details, e.g., electronic transaction data files, from electronic transaction operator device 12.

In some examples, bank server 14 may include and/or be configured to communicate with electronic transaction processing device 18. Electronic transaction processing device 18 may comprise a computing device configured to execute an electronic transaction repair unit 20 and maintain a manual repair queue 22 and an automatic repair queue 24. Electronic transaction processing device 18 may be configured to process electronic transactions, e.g., transactions initiated by one or more originators 4. For example, electronic transaction processing device 18 may gather, collect, and/or compile a plurality of transaction initiations from one or more originators 4 during a bank cycle and create an electronic transaction file in a predefined format. Electronic transaction processing device 18 may be configured to transmit the electronic transaction file to electronic transaction operator device 12 for processing and to receive the electronic transaction file from electronic transaction operator device 12 after processing. Electronic transaction processing device 18 may be configured to, after receiving the processed electronic transaction file, determine whether transaction information includes one or more errors causing an electronic transaction to fail and to send the failed electronic transaction and/or transaction information with the one or more errors to an automatic repair queue 24 and/or a manual repair queue 22. In some examples, electronic transaction processing device 18 may be configured to determine whether transaction information from a transaction initiation and/or within a transaction data file includes one or more errors that may cause an electronic transaction to fail, e.g., before sending the electronic transaction data file to electronic transaction operator device 12.

Electronic transaction repair unit 20 may be configured to send and receive electronic transactions and/or electronic transaction information to/from automatic repair queue 24 and/or manual repair queue 22. In some examples, electronic transaction repair unit 20 may determine whether an electronic transaction and/or electronic transaction information, e.g., from a failed electronic transaction, may be automatically repaired or manually repaired. For example, electronic transaction repair unit 20 may be configured to determine whether an electronic transaction and/or electronic transaction information associated with one or more failed electronic transactions may be repaired automatically and to automatically repair the electronic transaction and/or electronic transaction information.

In some examples, electronic transaction repair unit 20 may include one or more bots, e.g., software applications configured to repair an electronic transaction, such as bots 62A-62B illustrated and described below with reference to FIG. 2. For example, electronic transaction repair unit 20 may include a first bot configured to determine that a first electronic transaction failed due to one or more transposed digits in an account number of a bank account associated with identification information that matches the identification information associated with the failed first electronic transaction and to repair the failed first electronic transaction according to one or more business rules. Electronic transaction repair unit 20 may include a second bot configured to determine that a second electronic transaction failed due to one or more missing digits in a routing number of a bank account associated with identification information that matches the identification information associated with the failed first electronic transaction and to repair the failed first electronic transaction according to one or more business rules. In some examples, both the first bot and the second bot may be configured to run in parallel to determine and/or repair failed electronic transactions according to the same one or more business rules.

In some examples, electronic transaction processing device 18 may determine that the first electronic transaction failed and may send the first failed electronic transaction to automatic repair queue 24. The first bot may pull the first failed electronic transaction from automatic repair queue 24 and search for identification information in account database 8 that matches identification information associated with the first failed electronic transaction. If the first bot finds an account in account database 8 associated with identification information that matches the identification information associated with the first failed electronic transaction, the first bot may determine whether at least a portion of the account number from the account database 8 matches at least a portion of the account number associated with the failed first electronic transaction, e.g., a predetermined number of digits at a predetermined position within the account number match between the accounts. The predetermined number of digits that match and/or predetermined order of matching digits may comprise a match threshold. The first bot may then repair and/or replace one or more digits of the account number associated with the failed electronic transaction with the corresponding digits from the identified account number from the account database 8. In some examples, the first bot may then send the repaired electronic transaction to an electronic transaction processing queue (not shown) for processing by electronic transaction processing device 18. In some examples, the first bot may output a notification that the failed first electronic transaction is repaired and details of the repair, e.g., which digits were repaired, which account from account database 8 was used, and the like, to electronic transaction processing device 18 for display via a user interface and/or storing in memory to document a repair and/or repair history.

If the first bot does not find identification information in account database 8 that matches the identification information associated with the first failed electronic transaction, or if the first bot does find an account with matching identification information and determines that the account number does not meet the match threshold, the first bot may send and/or push the failed electronic transaction to manual repair queue 22 for potential repair or rejection by a human agent of the bank.

Similarly, electronic transaction processing device 18 may determine that the second electronic transaction failed and may send the second failed electronic transaction to automatic repair queue 24. The second bot may pull the second failed electronic transaction from automatic repair queue 24 and search for identification information in account database 8 that matches identification information associated with the second failed electronic transaction. If the second bot finds an account in account database 8 associated with identification information that matches the identification information associated with the second failed electronic transaction, the second bot may determine whether at least a portion of the routing number from the account database 8 matches at least a portion of the routing number associated with the failed second electronic transaction, e.g., whether a match threshold has been met. The second bot may then repair and/or replace one or more digits of the routing number associated with the failed electronic transaction with the corresponding digits from the identified routing number from the account database 8. In some examples, the second bot may then send the repaired electronic transaction to the electronic transaction processing queue (not shown) for processing by electronic transaction processing device 18. In some examples, the second bot may output a notification that the failed second electronic transaction is repaired and details of the repair, e.g., which digits were repaired, which account from account database 8 was used, and the like, to electronic transaction processing device 18 for display via a user interface and/or storing in memory to document a repair and/or repair history.

If the second bot does not find identification information in account database 8 that matches the identification information associated with the second failed electronic transaction, or if the second bot does find an account with matching identification information and determines that the routing number does not meet the match threshold, the second bot may send and/or push the failed electronic transaction to manual repair queue 22 for potential repair or rejection by a human agent of the bank. In some examples, first bot and second bot may be configured to repair first failed electronic transaction and second electronic transaction in parallel. For example, both first and second bots may be configured to repair both an account number and a routing number. In some examples, electronic transaction repair unit 20 may include a plurality of bots that may be configured to repair a plurality of electronic transactions including a plurality of different error types in parallel.

In some examples, the repair bots, e.g., first bot, second bot, or any of a plurality of bots included in electronic transaction repair unit 20, may be configured to process and/or repair a failed electronic transaction according to one or more business rules. For example, the repair bots may be configured to repair a failed electronic transaction based on transaction type, an exact and/or a partial identification match between the failed electronic transaction and accounts from account database 8, the number of accounts from account database 8 with an exact and/or partial identification information match to the identification information associated with the failed electronic transaction, the type of the cause of the failure, and any other business rule. In some examples, first bot and second bot may be configured to both repair a failed electronic transaction, e.g., the bots may each be configured to each make a portion of one or more determinations and one or more repairs to a failed electronic transaction according to one or more business rules via a specified order of operations and may "hand off" the failed electronic transaction to each other for execution of particular operations.

Figure 2:
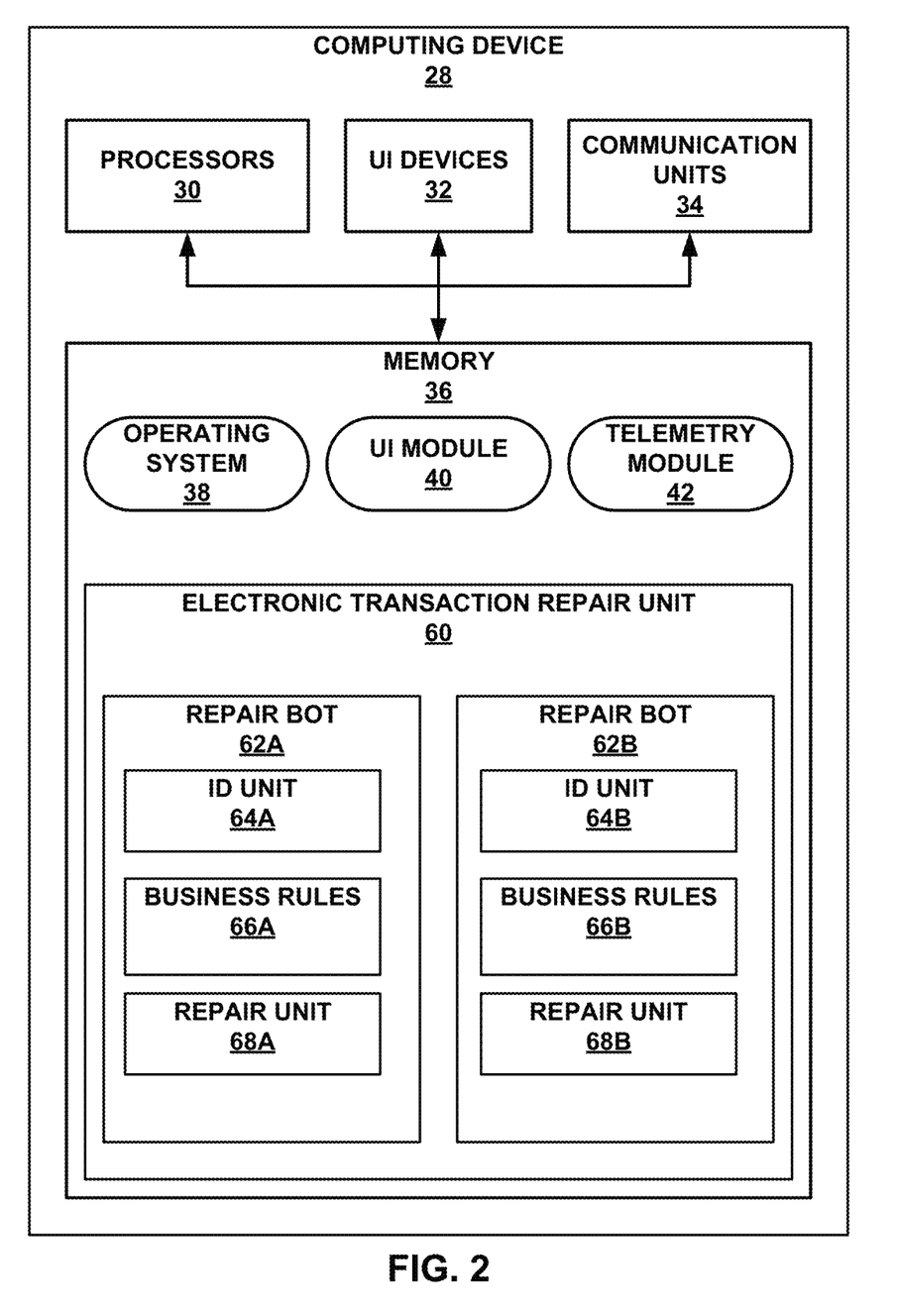
FIG. 2 is a block diagram illustrating an example computing device configured to execute a transaction repair bot, in accordance with the techniques of this disclosure.

FIG. 2 is a block diagram illustrating an example computing device 28 configured to execute electronic transaction repair unit 60, in accordance with the techniques of this disclosure. Computing device 28 may be an example of server 14 of FIG. 1 or electronic transaction processing device 18 of FIG. 1, which may be included within or in communication with server 14. The architecture of computing device 28 illustrated in FIG. 2 is shown for exemplary purposes only and computing device 28 should not be limited to this architecture. In other examples, computing device 28 may be configured in a variety of ways.

As shown in the example of FIG. 2, computing device 28 includes one or more processors 30, one or more user interface (UI) devices 32, one or more communication units 34, and one or more memory units 36. Memory 36 of computing device 28 includes operating system 38, UI module 40, telemetry module 42, and electronic transaction repair unit 60, which are executable by processors 30. Each of the components, units or modules of computing device 28 are coupled (physically, communicatively, and/or operatively) using communication channels for inter-component communications. In some examples, the communication channels may include a system bus, a network connection, an inter-process communication data structure, or any other method for communicating data.

Processors 30, in one example, may comprise one or more processors that are configured to implement functionality and/or process instructions for execution within computing device 28. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within computing device 28 during operation. Memory 36 may include a computer-readable storage medium or computer-readable storage device. In some examples, memory 36 include one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on computing device 28 (e.g., electronic transaction repair unit 60) to temporarily store information during program execution.

Computing device 28 may utilize communication units 34 to communicate with external devices via one or more networks, e.g., network 10 from FIG. 1, or via wireless signals. Communication units 34 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing device 28 utilizes communication units 34 to wirelessly communicate with an external device, such as electronic transaction operator device 12, originator devices 6, and account database 8 from FIG. 1.

UI devices 32 may be configured to operate as both input devices and output devices. For example, UI devices 32 may be configured to receive tactile, audio, or visual input from a user of computing device 28. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of computing device 28. For example, operating system 38, in one example, facilitates the communication of UI module 40, telemetry module 42, and electronic transaction repair unit 60 with processors 30, UI devices 32, communication units 34, and memory 36. UI module 40, telemetry module 42, and electronic transaction repair unit 60 may each include program instructions and/or data stored in memory 36 that are executable by processors 30. For example, electronic transaction repair unit 60 may include instructions that cause computing device 28 to perform one or more of the techniques described in this disclosure.

Computing device 28 may include additional components that, for clarity, are not shown in FIG. 2. For example, computing device 28 may include a battery to provide power to the components of computing device 28. Similarly, the components of computing device 28 shown in FIG. 2 may not be necessary in every example of computing device 28.

In the example illustrated in FIG. 2, electronic transaction repair unit 60 includes multiple repair bots, such as repair bot 62A and repair bot 62B, collectively referred to as repair bots 62. Although two repair bots are illustrated in FIG. 2, electronic transaction repair unit 60 may include one repair bot or three or more repair bots. Electronic transaction repair unit 60 may be an example of electronic transaction repair unit 20 of FIG. 1

Repair bots 62 may be configured to receive a failed electronic transaction and/or an electronic transaction data file, such as an ACH data file illustrated and described below with reference to FIG. 3, including a failed electronic transaction, e.g., from electronic transaction processing device 18 of FIG. 1. In some examples, repair bots 62 may be configured to retrieve a failed electronic transaction and/or an electronic transaction data file including a failed electronic transaction, for example, from a queue such as automatic repair queue 24 of FIG. 1, and may be configured to send a failed electronic transaction and/or an electronic data file including a failed electronic transaction to a queue such as manual repair queue 22, e.g., if the failure is not reparable by repair bots 62 or electronic transaction repair unit 60 and human intervention is needed. Repair bots 62 may be configured to determine the cause of the failure of the electronic transaction. For example, repair bots 62 may be configured to determine that processing of the electronic transaction failed due to an error in transaction information of the electronic transaction. In some examples, the error in transaction information may be a transposition of one or more digits of an account number and/or a routing number, a mismatch of one or more digits of an account number or a routing number when compared with an identified financial account from database 8, a missing digit in an account number and/or a routing number when compared with an identified financial account from database 8, and the like.

Repair bots 62 may include identification (ID) unit 64, business rules 66, and repair unit 68. In some examples, identification unit 64 may be configured to identify a financial account associated with a failed electronic transaction. In some examples, repair unit 68 may repair one or more errors according to one or more business rules, e.g., business rules 66 further described below. For example, identification unit 64 may be configured to extract transaction information associated with and/or included in the failed electronic transaction. Transaction information may include identification information, account information such as an account number and/or routing number, a unique individual identification number, and/or an individual's name. Identification unit 64 may be configured to access database 8 and compare the extracted identification information associated with the failed transaction information to identification information associated with one or more financial accounts in database 8, and or other financial account repositories or data sources. Identification unit 64 may be configured to determine a match between the identification information associated with the failed transaction information and the identification information associated with one or more financial accounts. In some examples, identification unit 64 may determine an exact match of identification information, and in some examples identification unit 64 may determine a partial match of identification information. Identification information associated with a failed electronic transaction may include, but is not limited to, a name, an address, a phone number, a birthdate, a unique individual identification number, a social security number (SSN), a tax identification number (TIN), a user name, password, or personal identification number (PIN), and the like, for both the originator and recipient of the electronic transaction. Identification information associated with a financial account may include, but is not limited to, a name, an address, a phone number, a birthdate, a unique individual identification number, a social security number (SSN), a tax identification number (TIN), a user name, password, or personal identification number (PIN), and the like, of the account holder, e.g., bank customer.

For example, identification unit 64 may determine an exact match between a SSN of a failed ACH transaction and a SSN of a bank account, e.g., the values and ordering of each digit of the identification information (SSN numbers) match. Repair bots 62 may then continue with further repair processing, e.g., repair steps performed by repair unit 68 according to business rules 66, using the identified bank account.

In some examples, identification unit 64 may determine an exact match between a SSN of a failed ACH transaction and more than one SSN of a bank account, e.g., mirrored SSNs associated with the bank account. Repair bots 62 may then continue with further repair processing, e.g., repair steps performed by repair unit 68 according to business rules 66, using the identified bank account.

In some examples, identification unit 64 may determine an exact match between a SSN of a failed ACH transaction and a bank account that has been closed and transferred to a new account including a new and different account number. In some examples, the closed account may include information with which repair bots 62 may use to determine a new account associated with the identified bank account, e.g., a transferred account. Repair bots 62 may then continue with further repair processing, e.g., repair steps performed by repair unit 68 according to business rules 66, using the identified bank account to which the identification matched account was transferred.

In some examples, identification unit 64 may determine an exact match between a SSN of a failed ACH transaction and a SSN of a bank account that includes more than one SSN, e.g., a joint banking account including a first SSN and a second SSN that is different from the first SSN that matches exactly. Repair bots 62 may then send the failed ACH transaction to manual repair queue 22 or to another device for potential repair or rejection by a human agent of the bank.

In another example, if identification unit 64 does not find an exact match in identification information with a financial account, identification unit 64 may determine a partial match. For example, identification unit 64 may determine a partial match between an SSN of a failed ACH transaction and an SSN of a bank account, e.g., the values and ordering of a predetermined number of digits that is less than all of the digits of the identification information (SSN numbers) match. Identification unit 64 may then compare additional transaction information associated with the failed electronic transaction and account information associated with the financial account, e.g., an account and/or routing number. For example, a match between the values and ordering of a predetermined number of digits of an account number and/or routing number between the failed ACH transaction and the bank account from account database 8 may confirm that the bank account that partially matches a SSN with the failed ACH transaction is the intended account, and repair bots 62 may then continue with further repair processing, e.g., repair steps performed by repair unit 68 according to business rules 66, using the identified bank account. If identification unit 64 does not find either an exact or a partial match in identification information with a financial account, repair bot 62 may send the failed transaction to manual repair queue 22 or to another device for potential repair or rejection by a human agent of the bank.

Repair unit 68 may be configured to repair one or more errors in the transaction information of a failed electronic transaction. In some examples, repair unit 68 may repair one or more errors according to one or more business rules included in business rules 66. Business rules 66 may include the criteria by which repair unit 68 may determine whether to repair a failed electronic transaction and how to repair a failed electronic transaction. Example business rules 66 may include which identification information to use to identify a financial account that may be used for repair, e.g., an SSN, a TIN, and the like. Example business rules 66 may include a threshold match between financial account identification information and failed electronic transaction identification information that partially matches and whether other information of either the potential financial account and the failed transaction is to be used, and how, in order to confirm the potential financial account is to be used to repair the failed transaction. Example business rules 66 may include whether identification information of the failed electronic transaction may be repaired and the criteria for its repair. Example business rules 66 may include what to do if multiple financial accounts include identification information that matches identification information of the failed transaction. Example business rules 66 may include how the error in transaction information may be repaired, e.g., based on the type of error. Example business rules 66 may include any other suitable criteria for repairing the failed transaction.

For example, business rules 66 may include a rule that a financial account must be associated with a SSN or a TIN that exactly matches a SSN or a TIN of the failed electronic transaction in order for account information of that financial account to be used to repair the error of the failed transaction, e.g., an "exact identification match" rule. Business rules 66 may include another business rule that if an SSN or TIN exact match is determined for a single financial account, information associated with that financial account may be used for repair of the failed transaction, but if an SSN or TIN exact match is determined for none or more than one financial account, then the failed transaction is to be sent to manual repair queue 22, e.g., a "single financial account match only" rule.

In some examples, business rules 66 may include contradictory rules and electronic transaction repair unit 60 or its components, e.g., identification unit 64 and repair unit 68, may be configured to determine which business rules are to be used. For example, business rules 66 may include the "single financial account match only" rule described above and a "multiple financial account match" rule that if an SSN or TIN exact match is determined for more than one financial account, information of the financial account that more closely matches other transaction information of the failed transaction is to be used to repair the failed transaction, e.g., an account number and/or routing number that most closely matches an account and/or routing number of the failed transaction. In some examples, electronic transaction repair unit 60 or its components may be configured to determine which business rule to use based on the type of error of the failed transaction, or via a choice by a user and/or another application program or bot, or the determination may be predetermined, e.g., "hard coded."

In further examples, business rules 66 may include a rule that identification information of a failed electronic transaction may be repaired, e.g., if the identification information of the failed electronic transaction includes a transposed, missing, or mismatched digit, character, and/or value may be repaired by identification information associated with a financial account, for example, if that identification information associated with the financial account matches the failed transaction identification information by a predetermined match threshold or greater, e.g., a "partial identification match" rule. In some examples, additional information such as an account and/or routing number, additional identification information, or any other suitable information that may be compared between the failed electronic transaction and the potential financial account to be used to repair it may be used to confirm that information associated with the potential financial account may be used to repair the identification information of the failed transaction.

In some examples, business rules 66 may include business rules regarding how an error of a failed electronic transaction may be repaired once a financial account has been identified, e.g., via matching identification information. In some examples, business rules 66 may include a business rule that a predetermined number of digits of an account number or a routing number must match in value and order between the failed electronic transaction and the financial account in order to repair the account and/or routing number. In some examples, business rules 66 may include a business rule that one of a predetermined number of digits of one or more sections, e.g., a beginning section, a middle section, and/or an ending section of an account number or a routing number must match in value and order between the failed electronic transaction and the financial account in order to repair the account and/or routing number. For example, business rules 66 may include a business rule that one of a first six, middle six, or last six digits of an account number or a routing number must match in value and order between the failed electronic transaction and the financial account in order to repair the account and/or routing number.

Figure 3:
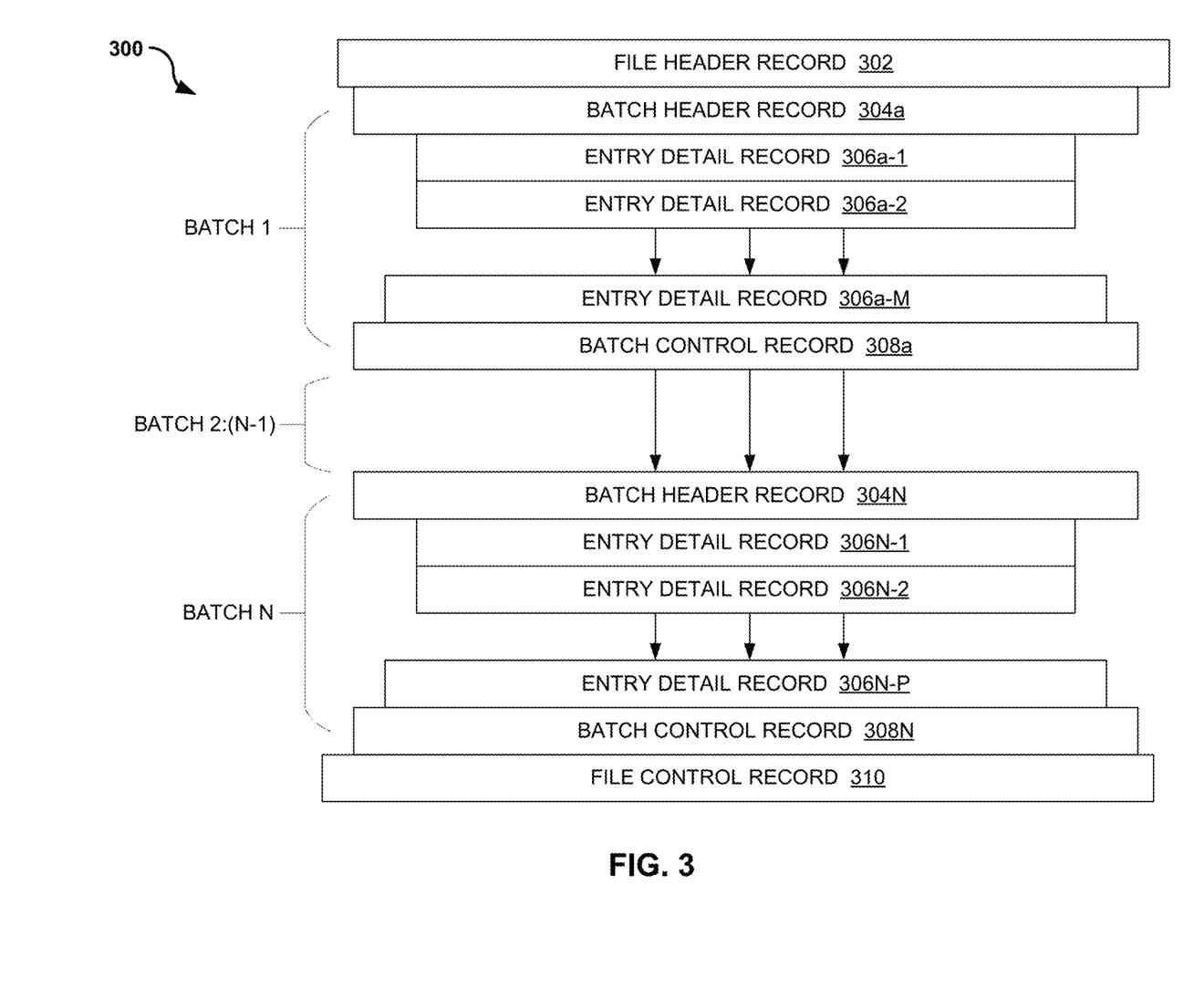
FIG. 3 illustrates a block diagram illustrating an example electronic transaction data file.

FIG. 3 illustrates a block diagram illustrating an example electronic transaction data file 300. The example shown is an ACH data file 300 in a NACHA file format. In the example shown, ACH data file includes multiple lines of data where each line is in American Standard Code for Information Interchange (ASCII) format and are each 94 characters in length. In the example shown, each line is referred to as a record, and there are five main record types: a file header record 302, a batch header record 304, a Prearranged Payment and Deposit (PPD) or a Cash Concentration and Disbursement (CCD) entry detail record 306, a batch control record 308, and a file control record 310. Data file 300 may contain one or more batches, and each batch may contain one or more PPD entries 306. In the example shown, data file 300 includes N batches, and each of the N batches may include the same or a different number of PPD entries 306, e.g., batch 1 includes M PPD entries 306a-1 through 306a-M, and batch N includes P entries 306N-1 through 306N-P, where M, N, and P are integers. Each of the five main record types may have its own predetermined format including one or more fields, where each field comprises a predetermined number of characters and/or digits of the 94 character length in a predetermined position within the 94 characters/digits.

In the example shown, data file 300 in the NACHA format includes exactly one file header record 302 and exactly one file control record 310. File header record 302 may include high level information about the contents of data file 300. Batch header records 304 may define shared characteristics of each entry detail record 306 within that batch, e.g., whether the entry detail records 306 of that batch are credits or debits. Batch header record 306 may also include text that the RDFI may include on a receiver's bank statement for the credit or debit.

Entry detail records 306 may include transaction information detailing each individual electronic transaction. For example, entry detail record 306 may include information relating to a transaction type, e.g., a transaction code field, RDFI identification information, e.g., an RDFI routing number, an RDFI account number being credited/debited, individual identification information, e.g., information that uniquely identifies the electronic transaction/entry detail record, e.g., a SSN number, a TIN number, and the like, and a trace number that uniquely identifies the electronic transaction/entry detail record, e.g., in case an inquiry as to the electronic transaction/entry detail record is needed.

Batch control record 308 may denote the end of the previous batch and may contain various checksums to enable a determination as to whether the batch was correctly generated and no information as lost during the transmission of the file. File control record 310 may be the last record in the file and may include various checksums to enable a determination as to whether data file 300 was correctly generated and no information was lost during the transmission of the file.

Figure 4:
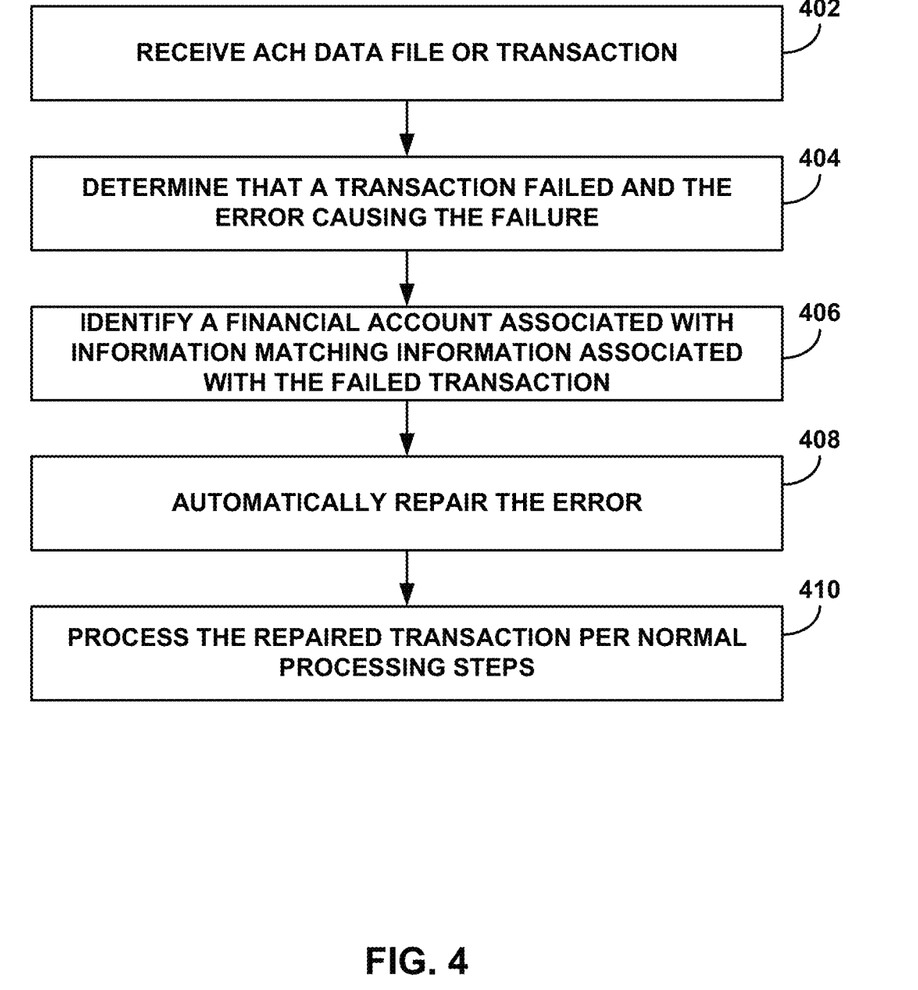
FIG. 4 is a flowchart illustrating an example method of repairing a failed electronic transaction via a transaction repair bot, in accordance with the techniques of this disclosure.

FIG. 4 is a flowchart illustrating an example method of repairing a failed electronic transaction via a transaction repair bot, in accordance with the techniques of this disclosure. Although FIG. 4 is discussed using computer-based system 2 of FIG. 1, computing device 28 of FIG. 2, and electronic transaction data file 300 of FIGS. 3, it is to be understood that the methods discussed herein may include and/or utilize other systems and methods in other examples.

Computing device 28 may receive an electronic transaction and/or electronic transaction data file including a plurality of electronic transactions (402). For example, the United States Treasury may send stimulus payments to individuals via ACH as an originator 6 to one or more banks via network 10, which may be processed via electronic transaction operator device 12, e.g., at the Federal Reserve, and an ACH data file 300 including one or more stimulus payments from electronic transaction operator device 12 may be received by computing device 28.

Computing device 28 14 may determine that at least one of the received electronic transactions failed due to an error in transaction information of each transaction or of the electronic transaction data file 300 (404). In some examples, computing device 28 may determine that at least one of the entry detail records 306 may include an error causing the electronic transaction to fail. Computing device 28 may further determine the error or may send transaction information associated with the failed transaction, e.g., data file 300, a portion of data file 300, the failed entry detailed record 306 or at least a portion of the failed entry detail record 306, to an automatic repair queue 24 for further processing and determination of the error.

Computing device 28, executing electronic transaction repair unit 60 and/or one or more repair bots 62, may identify at least one financial account including identification information that matches identification information included in the transaction information of the failed electronic transaction (406). For example, electronic transaction repair unit 60 and/or a repair bot 62 may receive or pull a failed transaction, or information associated with a failed transaction, or a data file including at least one failed transaction from automatic repair queue 24. Identification unit 64 may extract transaction information associated with and/or included in the failed electronic transaction, e.g., identification information, account information such as an account number and/or routing number, a unique individual identification number, and/or an individual's name, and/or any information included in an entry detail record 306 of the failed transaction.

Identification unit 64 may access database 8 and compare the extracted identification information associated with the failed transaction information to identification information associated with one or more financial accounts in database 8. Identification unit 64 may then determine a match between the identification information associated with the failed transaction information and the identification information associated with one or more financial accounts. In some examples, identification unit 64 may determine an exact match of identification information, and in some examples identification unit 64 may determine a partial match of identification information. For example, identification unit 64 may match all of the values of the digits/characters of the recipient's SSN included in entry detail record 306 with the recipient's SSN associated with a financial account in database 8. If identification unit 64 does not find an exact SSN match identification unit 64 may determine a partial SSN match greater than an identification information match threshold, e.g., if all but one or two of the SSN digits match. Identification unit 64 may then compare an account and/or routing number of the recipient's bank account from database 8 with an account and/or routing number of the failed electronic transaction, and may confirm the partial SSN match if at least a partial match between the account and/or routing number is equal to or greater than a match threshold. If identification unit 64 does not find at least a partial match in identification information match with a financial account, repair bot 62 may send the failed transaction to manual repair queue 22.

Computing device 28, executing electronic transaction repair unit 60 and/or one or more repair bots 62, may repair the error in the transaction information of the failed electronic transaction based on information associated with the identified financial account (408). In some examples, repair unit 68 may alter the values and/or digits of transaction information according to one or more business rules, e.g., from business rules 66, to correct the error. For example, repair unit 68 may repair an account number and/or a routing number of a failed transaction, e.g., in entry detail record 306, based on a match with an account number and/or a routing number of the identified financial account being greater than a predetermined match threshold, to be the account and/or routing number of the identified financial account. In some examples, repair unit 68 may replace one or more transposed digits, replace a mismatched digit, or add a missing digit in an account number and/or a routing number.

In some examples, repair unit 68 may repair an account and/or routing number if a single financial account is identified. In other examples, repair unit 68 may repair an account and/or a routing number of multiple financial accounts are identified, e.g., via at least a partial identification information match, and determine which financial account to use to make the repair, e.g., based on a closest match that satisfies a match threshold of an account and/or routing number in each of the financial accounts compared to the account and/or routing number of the failed electronic transaction. In some examples, repair unit 68 may repair an account and/or a routing number based on a match between the first six digits, the middle six digits, or the last six digits of an account number or a routing number included in the transaction information of the failed electronic transaction and a corresponding one of the first six digits, the middle six digits, or the last six digits of an account number or a routing number of the identified financial account.

In some examples, repair unit 68 may repair the identification information of the failed electronic transaction, e.g., if the identification information of the failed electronic transaction is missing a digit, has one or more digits transposed, and the like, based on a match between the first six digits, the middle six digits, or the last six digits of an account number or a routing number included in the transaction information of the failed electronic transaction and a corresponding one of the first six digits, the middle six digits, or the last six digits of an account number or a routing number of the identified financial account.

Computing device 28 may process the failed electronic transaction based on the repaired transaction information (410). For example, repair bot 62 may send the repaired electronic transaction and/or data file including the repaired electronic transaction to an electronic transaction processing queue.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
  receiving, by a computing device, an electronic financial transaction data file including a plurality of electronic financial transactions, wherein the electronic financial transaction data file comprises a data file formatted for an automated clearing house;
  determining, by the computing device executing a first bot, that processing of at least one electronic financial transaction of the plurality of electronic financial transactions has failed due to an error in transaction information of the at least one electronic financial transaction;
  identifying, by the computing device executing a second bot, at least one financial account including identification information that partially matches identification information included in the transaction information of the at least one electronic financial transaction;
  repairing, by the computing device executing the first bot, the error in the transaction information of the at least one electronic financial transaction based on information associated with the at least one financial account;
  repairing, by the computing device executing the second bot, the identification information based on identification information included in the information associated with the at least one financial account, wherein the first bot repairs the transaction information in parallel with the second bot repairing the identification information;
  processing, by the computing device, the at least one electronic financial transaction based on the repaired transaction information of the at least one electronic financial transaction; and
  outputting a notification that the failed electronic financial transaction is repaired and details of the repair.

2. The method of claim 1, wherein the identification information included in the transaction information of the at least one electronic financial transaction is one of a social security number or a tax identification number.

3. The method of claim 1, wherein the error in the transaction information is one of a transposition of one or more digits, a mismatched digit, or a missing digit in one of an account number or a routing number.

4. The method of claim 1, wherein identifying the at least one financial account comprises determining a match between one of a first six digits, a middle six digits, or a last six digits of an account number or a routing number included in the transaction information of the at least one electronic financial transaction and a corresponding one of a first six digits, a middle six digits, or a last six digits of an account number or a routing number of the financial account.

5. The method of claim 1, wherein repairing the error in the transaction information of the at least one electronic financial transaction comprises replacing at least one of a transposed, missing, or mismatched number included in the transaction information of the at least one electronic financial transaction with a number included in the information associated with the at least one financial account.

6. The method of claim 1, wherein repairing the error in the transaction information comprises executing at least one business rule, wherein executing the at least one business rule comprises:
  if a single financial account includes identification information that matches the identification information included in the transaction information of the at least one electronic financial transaction, determining a match between a predetermined number of digits of at least a portion of an account number or a routing number included in the transaction information of the at least one electronic financial transaction and at least a portion of an account number or a routing number of the single financial account; and
  repairing the account number or the routing number included in the transaction information of the at least one electronic financial transaction to be the account number or the routing number of the single financial account.

7. The method of claim 1, wherein repairing the error in the transaction information comprises executing at least one business rule, wherein executing at least one business rule comprises:
  if two or more financial accounts each includes identification information that matches the identification information included in the transaction information of the at least one electronic financial transaction, determining a match between a predetermined number of digits of at least a portion of an account number or a routing number included in the transaction information of the at least one electronic financial transaction and at least a portion of each of two or more account numbers or two or more routing numbers of each of the two or more financial accounts;
  determining which one of the two or more account number or two or more routing numbers of the two or more financial accounts is the closest match to the account number or the routing number included in the transaction information of the at least one electronic financial transaction; and
  repairing the account number or the routing number included in the transaction information of the at least one electronic financial transaction to be the account number or the routing number of the one of the two or more account numbers or two or more routings numbers that is the closest match.

8. The method of claim 1, wherein repairing the error in the transaction information comprises executing at least one business rule, wherein executing at least one business rule comprises:
  if a financial account includes identification information that matches the identification information included in the transaction information of the at least one electronic financial transaction and is closed, determining a new financial account to which the financial account was transferred; and repairing the account number or the routing number included in the transaction information of the at least one electronic financial transaction to be the account number or the routing number of the new financial account.

9. The method of claim 1,
wherein identifying the at least one financial account comprises determining a match between one of a first six digits, a middle six digits, or a last six digits of an account number or a routing number included in the transaction information of the at least one electronic financial transaction and a corresponding one of a first six digits, a middle six digits, or a last six digits of an account number or a routing number of the financial account; and wherein repairing the identification information comprises, upon determining the match between the one of the first six digits, the middle six digits, or the last six digits of the account number or the routing number included in the transaction information of the at least one electronic financial transaction and the corresponding one of the first six digits, the middle six digits, or the last six digits of the account number or the routing number of the financial account, repairing the identification information based on the identification information included in the information associated with the at least one financial account.

10. The method of claim 1, wherein the formatting of the data file formatted for an automated clearing house comprises a National Automated Clearinghouse Association format.

11. A system comprising:
a database including a plurality of financial accounts;
a memory; and
one or more processors in communication with the database and the memory, the one or more processors configured to execute a first bot and a second bot to:
receive an electronic financial transaction data file including a plurality of electronic financial transactions, wherein the electronic financial transaction data file comprises a data file formatted for an automated clearing house;
determine, via the first bot, that processing of at least one electronic financial transaction of the plurality of electronic financial transactions has failed due to an error in transaction information of the at least one electronic financial transaction;
identify, via the second bot, at least one financial account in the database including identification information that partially matches identification information included in the transaction information of the at least one electronic financial transaction;
repair, via the first bot, the error in the transaction information of the at least one electronic financial transaction based on information associated with the at least one financial account;
repair, via the second bot, the identification information based on identification information included in the information associated with the at least one financial account, wherein the first bot repairs the transaction information in parallel with the second bot repairing the identification information;

send the repaired at least one electronic financial transaction to an electronic financial transaction processing queue; and
output a notification that the failed electronic financial transaction is repaired and details of the repair.

12. The system of claim 11, wherein the identification information included in the transaction information of the at least one electronic financial transaction is one of a social security number or a tax identification number.

13. The system of claim 11, wherein the error in the transaction information is one of a transposition of one or more digits, a mismatched digit, or a missing digit in one of an account number or a routing number.

14. The system of claim 11, wherein identifying the at least one financial account comprises determining a match between one of a first six digits, a middle six digits, or a last six digits of an account number or a routing number included in the transaction information of the at least one electronic financial transaction and a corresponding one of a first six digits, a middle six digits, or a last six digits of an account number or a routing number of the financial account.

15. The system of claim 11, wherein repairing the error in the transaction information of the at least one electronic financial transaction comprises replacing at least one of a transposed, missing, or mismatched number included in the transaction information of the at least one electronic financial transaction with a number included in the information associated with the at least one financial account.

16. The system of claim 11, wherein repairing the error comprises:
if a single financial account includes identification information that matches the identification information included in the transaction information of the at least one electronic financial transaction, determine a match between a predetermined number of digits of at least a portion of an account number or a routing number included in the transaction information of the at least one electronic financial transaction and at least a portion of an account number or a routing number of the single financial account; and
repair the account number or the routing number included in the transaction information of the at least one electronic financial transaction to be the account number or the routing number of the single financial account.

17. The system of claim 11, wherein repairing the error comprises:
if two or more financial accounts each includes identification information that matches the identification information included in the transaction information of the at least one electronic financial transaction, determine a match between a predetermined number of digits of at least a portion of an account number or a routing number included in the transaction information of the at least one electronic financial transaction and at least a portion of each of two or more account numbers or two or more routing numbers of each of the two or more financial accounts;
determine which one of the two or more account number or two or more routing numbers of the two or more financial accounts is the closest match to the account number or the routing number included in the transaction information of the at least one electronic financial transaction; and
repair the account number or the routing number included in the transaction information of the at least one electronic financial transaction to be the account number or the routing number of the one of the two or more account numbers or two or more routings numbers that is the closest match.

18. The system of claim 11, wherein repairing the error comprises:
if a financial account includes identification information that matches the identification information included in the transaction information of the at least one electronic financial transaction and is closed, determine a new financial account to which the financial account was transferred; and
repair the account number or the routing number included in the transaction information of the at least one electronic financial transaction to be the account number or the routing number of the new financial account.

19. A non-transitory computer readable medium comprising instructions that when executed cause one or more processors executing a first bot and second bot to:
receive an electronic financial transaction data file including a plurality of electronic financial transactions, wherein the electronic financial transaction data file comprises a data file formatted for an automated clearing house;
determine, via the first bot, that processing of at least one electronic financial transaction of the plurality of electronic financial transactions has failed due to an error in transaction information of the at least one electronic financial transaction;
identify, via the second bot, at least one financial account including identification information that partially matches identification information included in the transaction information of the at least one electronic financial transaction;
repair, via the first bot, the error in the transaction information of the at least one electronic financial transaction based on information associated with the at least one financial account, wherein to repair the error;
repair, via the second bot, the identification information based on identification information included in the information associated with the at least one financial account, wherein the first bot repairs the transaction information in parallel with the second bot repairing the identification information;
process the at least one electronic financial transaction based on the repaired transaction information of the at least one electronic financial transaction; and
output a notification that the failed electronic financial transaction is repaired and details of the repair.

* * * * *